US012373742B2

(12) United States Patent
Chatani et al.

(10) Patent No.: US 12,373,742 B2
(45) Date of Patent: Jul. 29, 2025

(54) INFORMATION PROCESSING SYSTEM, INFORMATION PROCESSING DEVICE, METHOD OF CONTROLLING INFORMATION PROCESSING DEVICE, PROGRAM THAT CONTROLS INFORMATION PROCESSING DEVICE, COMMUNICATION TERMINAL, METHOD OF CONTROLLING COMMUNICATION TERMINAL, AND PROGRAM THAT CONTROLS COMMUNICATION TERMINAL

(71) Applicant: SoftBank Corp., Tokyo (JP)

(72) Inventors: Ko Chatani, Tokyo (JP); Takashi Isa, Tokyo (JP); Shinya Kojima, Tokyo (JP); Hiroyoshi Hirakawa, Tokyo (JP)

(73) Assignee: SoftBank Corp., Tokyo (JP)

( * ) Notice: Subject to any disclaimer, the term of this patent is extended or adjusted under 35 U.S.C. 154(b) by 0 days.

(21) Appl. No.: 18/084,422

(22) Filed: Dec. 19, 2022

(65) Prior Publication Data

US 2023/0120776 A1    Apr. 20, 2023

Related U.S. Application Data

(63) Continuation of application No. PCT/JP2021/030084, filed on Aug. 17, 2021.

(30) Foreign Application Priority Data

Aug. 21, 2020 (JP) ................. 2020-140150

(51) Int. Cl.
*G06Q 10/02* (2012.01)
*G06F 21/44* (2013.01)
*G06Q 50/10* (2012.01)

(52) U.S. Cl.
CPC .......... *G06Q 10/025* (2013.01); *G06F 21/44* (2013.01); *G06Q 50/10* (2013.01)

(58) Field of Classification Search
CPC ....... G06Q 10/025; G06Q 50/10; G06F 21/44
See application file for complete search history.

(56) References Cited

U.S. PATENT DOCUMENTS

| 9,998,503 B2 * | 6/2018 | Seferian .............. H04L 12/1818 |
| 2013/0085609 A1 * | 4/2013 | Barker .................. G05B 15/02 700/276 |

(Continued)

FOREIGN PATENT DOCUMENTS

| JP | 1992-165569 A | 6/1992 |
| JP | 1994-017564 A | 1/1994 |

(Continued)

OTHER PUBLICATIONS

Owens, Darryl E., "Your Travel Guide to the '96 Olympics; Headed to the Games or Through Atlanta? Here Are Answers to Many of Your Questions," Orlando Sentinel, Florida, Nov. 5, 1995, p. L1.*

(Continued)

*Primary Examiner* — Nathan Erb
(74) *Attorney, Agent, or Firm* — DLA Piper LLP (US)

(57) ABSTRACT

An information processing system includes: a gateway connecting facilities of which control performed by an unauthorized user is restricted to a network; an information processing device connected to the facilities via the network; and a communication terminal of the user, in which the information processing device includes: an authority generating unit generating authority information about provisional authority used for controlling facilities relating to a use target among the facilities on the basis of reservation information about a use reservation for the use target in a building; and a communication unit transmitting the authority information to a communication terminal of a user (Continued)

relating to the reservation information, and the communication terminal includes a control request generating unit generating a control request for requesting predetermined control of the facilities relating to the use target on the basis of the provisional authority.

10 Claims, 13 Drawing Sheets

(56) References Cited

U.S. PATENT DOCUMENTS

| | | | |
|---|---|---|---|
| 2014/0108084 A1* | 4/2014 | Bargetzi | H04M 3/565 |
| | | | 705/7.19 |
| 2016/0212831 A1 | 7/2016 | Dobai et al. | |
| 2018/0139253 A1* | 5/2018 | Ruetschi | H04M 3/565 |
| 2018/0255627 A1* | 9/2018 | Aggarwal | H04W 52/04 |
| 2019/0156297 A1* | 5/2019 | Vitali | H04L 51/046 |
| 2021/0350333 A1* | 11/2021 | Hashimoto | G06Q 10/1093 |
| 2022/0058534 A1 | 2/2022 | Ishida | |

FOREIGN PATENT DOCUMENTS

| | | |
|---|---|---|
| JP | 2005-032100 A | 2/2005 |
| JP | 2014-040717 A | 3/2014 |
| JP | 2014-055438 A | 3/2014 |
| JP | 2016-535925 A | 11/2016 |
| JP | 2017-019597 A | 1/2017 |
| JP | 2017-091116 A | 5/2017 |
| JP | 2017-201475 A | 11/2017 |
| JP | 6644309 B | 1/2020 |
| KR | 1020190028134 A | 3/2019 |
| WO | 2019/012644 A | 1/2019 |
| WO | 2019/064536 A | 4/2019 |
| WO | WO 2019/216942 A1 * | 11/2019 ............. G05B 15/02 |

OTHER PUBLICATIONS

Official Action dated Dec. 8, 2020 in counterpart Japanese Patent Application No. 2020-140150 w/English translation.
Official Action dated Apr. 13, 2021 in counterpart Japanese Patent Application No. 2020-140150 w/English translation.
International Search Report dated Oct. 26, 2021 in counterpart International Application No. PCT/JP2021/030084 w/English translation.
Official Action dated Dec. 13, 2022 in counterpart Japanese Patent Application No. 2021-010303 w/English translation.

* cited by examiner

FIG. 3

USER INFORMATION TABLE

| USER ID | USER NAME | TERMINAL ID | MAIL ADDRESS | COMPANY ID | BELONGING INFORMATION | ... |
|---|---|---|---|---|---|---|
| user_A | *** | id_* | @***.com | com_ | ** | |
| user_B | *** | id_* | @***.com | com_* | **** | |
| user_C | *** | id_* | @***.com | com_* | **** | |
| ... | | | | | | |

USE TARGET INFORMATION TABLE  TB20

| COMPANY ID = com_**** |||||
|---|---|---|---|---|
| PLACE NAME | SECTION ID | USE TARGET ID | FACILITY ID || LOCATION INFORMATION |
| AB BUILDING 2ND FLOOR | zone_**2S | obj_001 | eqi_air_001<br>eqi_light_001<br>eqi_shade_001 | elv_001<br>elv_002 | LONGITUDE ⋯<br>LATITUDE ⋯ |
| | | obj_002 | eqi_air_002<br>eqi_light_002<br>eqi_shade_002 | | |
| | | obj_003 | eqi_air_003<br>eqi_light_003 | | |
| | | ⋮ | ⋮ | | |
| | zone_2N | obj_* | eqi_air_*<br>eqi_light_*<br>eqi_shade_*** | elv_003<br>elv_004 | |
| | | obj_* | eqi_air_*<br>eqi_light_*** | | |
| | | ⋮ | ⋮ | | |
| | ⋮ | ⋮ | ⋮ | ⋮ | |
| AB BUILDING 5TH FLOOR | zone_**5W | ⋮ | ⋮ | | |
| | | ⋮ | ⋮ | | |
| | zone_**5E | ⋮ | ⋮ | | |
| | | ⋮ | ⋮ | | |

FIG. 5

FACILITY INFORMATION TABLE

TB30

| AIR CONDITIONING FACILITY | | |
|---|---|---|
| FACILITY ID | UNIQUE NUMBER | IP ADDRESS |
| eqi_air_001 | *3E-t*q | *.*.*.*** |
| eqi_air_002 | 49kA*o | *.*.*.*** |
| ... | ... | ... |
| eqi_air_301 | p9Ff*** | *.*.*.*** |
| ... | ... | ... |

TB31

| LIGHTING FACILITY | | |
|---|---|---|
| FACILITY ID | UNIQUE NUMBER | IP ADDRESS |
| eqi_light_001 | 056**p | *.*.*.*** |
| eqi_light_002 | 89e*** | *.*.*.*** |
| ... | ... | ... |
| eqi_light_301 | 568e | *.*.*.*** |
| ... | ... | ... |

FIG. 6

RESERVATION INFORMATION TABLE

TB40

| RESERVATION ID | RESERVATION USER ID | RESERVATION YEAR, MONTH, AND DATE | RESERVATION TIME FRAME | USE TARGET ID | USING USER ID | ... |
|---|---|---|---|---|---|---|
| rsv_001 | user_B | 07/08/2020 | 15:00-16:30 | obj_001 | user_B user_C user_W user_N | |
| rsv_002 | user_A | 07/15/2020 | 9:00-12:00 | obj_1018 | user_C | |
| ... | ... | ... | ... | ... | | |
| rsv_010 | user_E | 07/28/2020 | 9:00-10:00 | obj_0117 | user_K user_P | |
| ... | ... | ... | ... | ... | | |

FIG. 9

ELEVATOR INFORMATION TABLE

TB50

| ELEVATOR ID | SECTION ID | BEACON ID | LOCATION INFORMATION |
|---|---|---|---|
| elv_001 | zone_2S | 1ghj.2hwe | LONGITUDE:* LATITUDE:*** |
| elv_002 | zone_2S | .** | LONGITUDE LATITUDE |
| ... | ... | ... | ... |
| elv_018 | zone_5W | .** | LONGITUDE LATITUDE |
| ... | ... | ... | ... |

FIG. 12

RESERVATION INFORMATION TABLE TB60

| RESERVATION ID | AUTHENTICATION ID | RESERVATION YEAR, MONTH, AND DATE | RESERVATION TIME FRAME | USE TARGET ID | USE TARGET ID | RELEASE INFORMATION |
|---|---|---|---|---|---|---|
| rsv_100 | auth_** | 07/08/2020 | 15:00-16:30 | obj_001 | user_001 (*@***.com, 090--*)<br>user_002 (*@***.com, 070--***) | PRESENT |
| rsv_102 | auth_** | 07/15/2020 | 9:00-12:00 | obj_1018 | user_005 (*@***.com, 090--*)<br>user_006 (*@*****.com) | PRESENT |
| ... | ... | ... | ... | ... | ... | |
| rsv_021 | auth_** | 07/28/2020 | 9:00-10:00 | obj_0117 | user_010 (*@***.com, 090--*)<br>user_011 (*@***.com, 070--*)<br>user_012 (*@***.com, 070--***) | ABSENT |
| ... | ... | ... | ... | ... | ... | |

INFORMATION PROCESSING SYSTEM, INFORMATION PROCESSING DEVICE, METHOD OF CONTROLLING INFORMATION PROCESSING DEVICE, PROGRAM THAT CONTROLS INFORMATION PROCESSING DEVICE, COMMUNICATION TERMINAL, METHOD OF CONTROLLING COMMUNICATION TERMINAL, AND PROGRAM THAT CONTROLS COMMUNICATION TERMINAL

TECHNICAL FIELD

This disclosure relates to an information processing system, an information processing device, a method of controlling an information processing device, a program that controls an information processing device, a communication terminal, a method of controlling a communication terminal, and a program that controls a communication terminal.

BACKGROUND

Conventionally, technologies for starting control of various facilities installed in a conference room in accordance with start of use of the conference room that has been reserved are disclosed. For example, in a common facility management method disclosed in Japanese Unexamined Patent Application No. H4-165569, facilities such as an air conditioning device, a lamp and the like of a conference room are turned on in accordance with unlocking of the conference room. In addition, in Japanese Unexamined Patent Application No. H6-017564, it has been disclosed to register reservation data of a conference room and the like, search for reservation data before or after use of the conference room or the like, and perform control of turning-on/off of lights thereof in synchronization with locking/unlocking of an electric lock of the conference room or the like.

SUMMARY

We provide an information processing system including: a gateway connecting facilities of which control performed by an unauthorized user is restricted to a network; an information processing device connected to the facilities via the network; and a communication terminal of the user, in which the information processing device includes: an authority generating unit generating authority information about a provisional authority used for controlling facilities relating to a use target among the facilities on the basis of reservation information about a use reservation for the use target in a building; and a communication unit transmitting the authority information to a communication terminal of a user relating to the reservation information, and the communication terminal includes a control request generating unit generating a control request for requesting predetermined control of the facilities relating to the use target on the basis of the provisional authority.

The reservation information may include a reservation date and time of the use target and using user information about the user, and the communication unit may transmit the authority information to the communication terminal of the user identified by the using user information.

When a period to the reservation date and time becomes within a predetermined threshold, the communication unit may transmit the authority information to the communication terminal of the user.

The communication unit may receive the control request from the communication terminal and transmit the control request to a target facility requesting the predetermined control.

The authority generating unit may generate authority information about provisional authority for controlling facilities installed in a path to the use target in the building or facilities installed in the use target.

The communication terminal may further include an acceptance unit accepting input of control based on the provisional authority for facilities relating to the use target from the user, and the control request generating unit may generate the control request on the basis of the input.

The communication terminal may further include a location information acquiring unit acquiring location information about a current location of its own terminal in the building, and the control request generating unit may generate a control request for requesting predetermined control for facilities relating to the location information among the facilities relating to the use target on the basis of the location information and the provisional authority.

The communication unit may receive the location information from the communication terminal and transmit a release signal for releasing the restriction for facilities associated with the location information among the facilities relating to the use target to the facilities associated with the location information, and the facilities associated with the location information may be able to perform direct control input for input devices included in the facilities in accordance with the release signal.

The location information acquiring unit of the communication terminal may acquire the location information using a beacon signal transmitted from at least one beacon terminal disposed in the building.

We also provide an information processing system including: a gateway connecting facilities of which control performed by an unauthorized user is restricted to a network; an authentication terminal used for authenticating a user; an information processing device connected to the facilities and the authentication terminal via the network; and a communication terminal of the user, in which the information processing device includes: an authentication information generating unit generating authentication information used for authenticating the communication terminal on the basis of reservation information about a use reservation for a use target in a building; a communication unit transmitting the authentication information to the communication terminal; and a release information generating unit generating release information about release of control of facilities relating to the use target and the authentication terminal among the facilities on the basis of the reservation information and storing the release information in a storage device in association with the authentication information, and the authentication terminal acquires the release information associated with the authentication information from the storage device and transmits a release signal for releasing the restriction to a facility relating to the authentication information on the basis of the release information.

When a period to a reservation date and time of the use target becomes within a predetermined threshold, the release information generating unit may store the release information in the storage device in association with the authentication information.

We further provide an information processing device connected to facilities of which control performed by an unauthorized user is restricted via a network, the information processing device including: an authority generating unit generating authority information about provisional authority used for controlling facilities relating to a use target among the facilities on the basis of reservation information about a use reservation for the use target in a building; and a communication unit transmitting the authority information to a communication terminal of a user relating to the reservation information, in which the communication unit receives a control request for requesting predetermined control for facilities relating to the use target, which is generated on the basis of the provisional authority in the communication terminal, and transmits the control request to the facilities relating to the use target.

We still further provide a method of controlling an information processing device connected to facilities of which control performed by an unauthorized user is restricted via a network, the method of controlling the information processing device including: a step of generating authority information about provisional authority used for controlling facilities relating to a use target among the facilities on the basis of reservation information about a use reservation for the use target in a building; a step of transmitting the authority information to a communication terminal of a user relating to the reservation information; a step of receiving a control request for requesting predetermined control for facilities relating to the use target, which is generated on the basis of the provisional authority in the communication terminal; and a step of transmitting the control request to the facilities relating to the use target.

We yet further provide a program that controls an information processing device connected to facilities of which control performed by an unauthorized user is restricted via a network, the program that controls the information processing device causing the information processing device to embody: a function of generating authority information about provisional authority used for controlling facilities relating to a use target among the facilities on the basis of reservation information about a use reservation for the use target in a building; a function of transmitting the authority information to a communication terminal of a user relating to the reservation information; a function of receiving a control request for requesting predetermined control for facilities relating to the use target, which is generated on the basis of the provisional authority in the communication terminal; and a function of transmitting the control request to the facilities relating to the use target.

We also provide a communication terminal of an information processing system including: a gateway connecting facilities of which control performed by an unauthorized user is restricted to a network; an information processing device connected to the facilities via the network; and a communication terminal associated with the user, the communication terminal including: a reception unit receiving authority information about provisional authority used for controlling facilities relating to a use target among the facilities from the information processing device on the basis of reservation information about a use reservation for the use target in a building; a control request generating unit generating a control request for requesting predetermined control for facilities relating to the use target on the basis of the provisional authority; and a transmission unit transmitting the control request to the information processing device.

We still yet further provide a method of controlling a communication terminal of an information processing system including: a gateway connecting facilities of which control performed by an unauthorized user is restricted to a network; an information processing device connected to the facilities via the network; and a communication terminal associated with the user, the method of controlling the communication terminal causing the communication terminal to perform: a step of receiving authority information about provisional authority used for controlling facilities relating to a use target among the facilities from the information processing device on the basis of reservation information about a use reservation for the use target in a building; a step of generating a control request for requesting predetermined control for facilities relating to the use target on the basis of the provisional authority; and a step of transmitting the control request to the information processing device.

We further provide a program that controls a communication terminal of an information processing system including: a gateway connecting facilities of which control performed by an unauthorized user is restricted to a network; an information processing device connected to the facilities via the network; and a communication terminal associated with the user, the program for controlling the communication terminal causing the communication terminal to embody: a function of receiving authority information about provisional authority used for controlling facilities relating to a use target among the facilities from the information processing device on the basis of reservation information about a use reservation for the use target in a building; a function of generating a control request for requesting predetermined control for facilities relating to the use target on the basis of the provisional authority; and a function of transmitting the control request to the information processing device.

We also provide a method of controlling an information processing device of an information processing system including: a gateway connecting facilities of which control performed by an unauthorized user is restricted to a network; an authentication terminal used for authenticating a user; an information processing device connected to the facilities and the authentication terminal via the network; and a communication terminal of the user, the method of controlling the information processing device including: a step of generating authentication information used for authenticating the communication terminal on the basis of reservation information about a use reservation for a use target in a building; a step of transmitting the authentication information to the communication terminal; and a step of generating release information about release of control of facilities relating to the use target and the authentication terminal among the facilities on the basis of the reservation information and storing the release information in a storage device in association with the authentication information.

We still further provide a program that controls an information processing device of an information processing system including: a gateway connecting facilities of which control performed by an unauthorized user is restricted to a network; an authentication terminal used for authenticating a user; an information processing device connected to the facilities and the authentication terminal via the network; and a communication terminal of the user, the program for controlling the information processing device causing the information processing device to embody: a function of generating authentication information used for authenticating the communication terminal on the basis of reservation information about a use reservation for a use target in a building; a function of transmitting the authentication information to the communication terminal; and a function of generating release information about release of control of facilities relating to the use target and the authentication terminal among the facilities on the basis of the reservation information and storing the release information in a storage device in association with the authentication information.

BRIEF DESCRIPTION OF THE DRAWINGS

Features, advantages, and technical and industrial significance of examples will be described below with reference to the accompanying drawings, in which like numerals denote like elements.

FIG. 3 is an example of a user information table stored in the information processing system according to the first example.

FIG. 4 is an example of a use target information table stored in the information processing system according to the first example.

FIG. 5 is an example of a facility information table stored in the information processing system according to the first example.

FIG. 6 is an example of a reservation information table stored in the information processing system according to the first example.

FIG. 9 is an example of an elevator information table stored in the information processing system according to the first example.

FIG. 12 is an example of a reservation information table stored in the information processing system according to the second example.

REFERENCE SIGNS LIST

Figure 1:
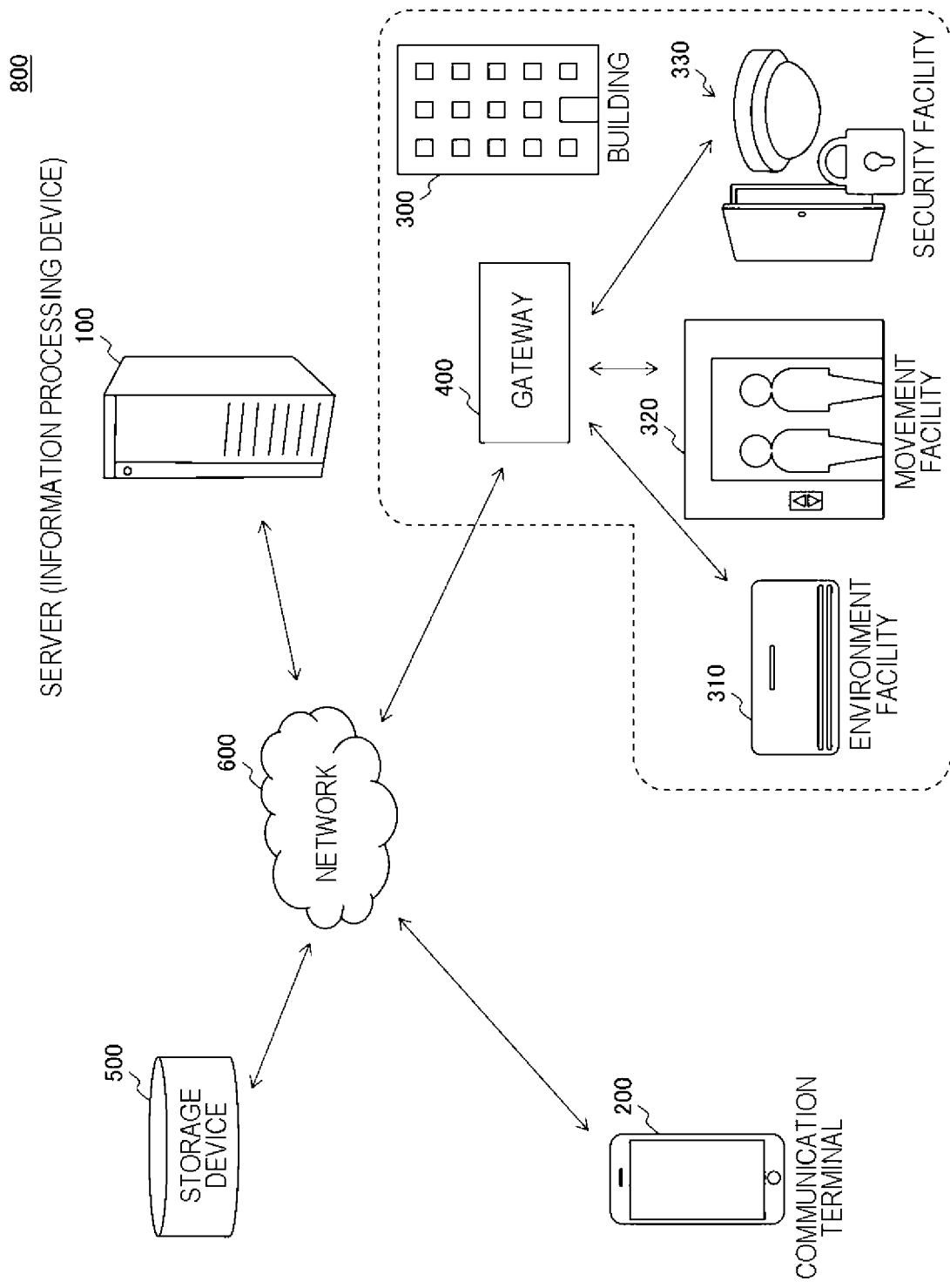
FIG. 1 is a schematic diagram of a configuration of an information processing system according to a first example.

100 Server (information processing device)
110 Control unit
111 Communication control unit
112 Input/output control unit
113 Reservation setting unit
114 Authority generating unit
115 Extraction unit
116 Release information generating unit
117 Authentication information generating unit
120 Communication I/F
130 Input/output I/F
200 Communication terminal
210 Control unit
211 Communication control unit
212 Display control unit
213 Input/output control unit
214 Control request generating unit
215 Location information acquiring unit
220 Communication I/F
230 Input/output I/F
240 Display unit
270 Storage unit
300 Building
310 to 330 Facility
400 Gateway
500 Storage Device
600 Network
700 Authentication terminal
800 Information processing system

DETAILED DESCRIPTION

First Example

System Configuration

First, an example (also first example) will be described. FIG. 1 is a diagram illustrating an example of a configuration of an information processing system. The information processing system 800 may include a server (an information processing device) 100, a communication terminal 200 of a user, a gateway 400 that connects various facilities 310 to 330 installed inside a building 300 to a network 600, and a storage device 500. Hereinafter, although when an information processing system applied to a building will be described, a target system is not particularly limited. For example, targets may be all the targets of which security is secured at least by some of various facilities described below, and, for example, it should be noted that our system can be applied also to a store, a hotel, a house, an apartment house and the like.

The information processing system 800 may provide a reservation service for a use target for a user using the server 100. The server 100 may be an information processing device of a manager side managing the information processing system 800. The use target may be a target that can be reserved by a user using a reservation service. For example, the use target may be a space such as a conference room, a reception room, or an office in the building 300 but is not limited thereto. The server 100 may be connected to the communication terminal 200, various facilities inside the building 300, and the storage device 500 via the network 600. The server 100 may control various facilities 310 to 330. In other words, the information processing system 800 may be a system relating to a smart building embodied by the Internet of Things (IoT) connecting the various facilities 310 to 330 to a network.

Various facilities inside the building 300 may be facilities of which control performed by an unauthorized user is restricted. For example, various facilities may be facilities installed in a use target, a passage, a common space and the like inside the building 300. Various facilities, for example, may include an environment facility 310, a movement facility 320, a security facility 330 and the like. The environment facility 310 may be a facility relating to an environment inside the building. The environment facility 310 may be a cooling/heating facility, a lighting facility, a window, an acoustic facility, an electronic device (a monitor or a printer), or the like. The movement facility 320 may be a facility relating to movement inside a building. The movement facility 320, for example, may be an elevator, an escalator, or the like. In addition, the security facility 330 may be a facility relating to security of the inside of a building. The security facility 330, for example, may be a gate of an entry/exit opening, an electronic lock, any one of various warning devices, or the like. The "unauthorized user" may be a user who is not permitted to control various facilities. The unauthorized user, for example, may be a user desiring to rent a use target from an owner of a use target or a manager of a building. It is apparent that the various facilities are not limited to those illustrated in FIG. 1. In addition, although one building is illustrated in FIG. 1, the information processing system 800 may include a plurality of buildings, and the server 100 may perform a reservation for a use target disposed in each building and control of various facilities that are installed.

In addition, although only one server 100 is illustrated in FIG. 1, the configuration is not limited thereto, and a distributed-type server system cooperatively operating through communication via a network or a so-called a cloud server may be used. In other words, the server 100 is not limited to a physical server and may include a virtual server as well.

The communication terminal 200 of a user may be a communication terminal associated with the user using a reservation service provided by the information processing system 800. In addition, "being associated" is mapping between a communication terminal and a user and, for example, may represent that a user who has input information transmitted from a certain communication terminal is identified. Thus, even when the communication terminal 200 is a terminal that is commonly used by a plurality of users, it may represent that a user can be identified using a login for a service or the like. In the communication terminal 200, an application for using a reservation service may be installed. Alternatively, installation of an application in the communication terminal 200 is not essential, and a web page for using a sharing service provided by the server 100 may be accessed from the communication terminal 200 through a web browser or the like. In FIG. 1, although a smartphone is illustrated as the communication terminal 200, any terminal may be used as the communication terminal 200 as long as the terminal can embody functions to be described in each example described below. For example, the communication terminal 200 may be a mobile phone (a feature phone), a computer (for example, a tablet, a desktop PC, or a laptop PC), or a hand-held computer device (for example, a personal digital assistant (PDA) or a wearable terminal (a glasses-type device, a watch-type device, or the like) but not limited thereto). In addition, although only one communication terminal 200 is illustrated in FIG. 1, more communication terminals, that is, communication terminals corresponding to the number of users using a reservation service, may be present, and a plurality of communication terminals (for example, a smartphone, a laptop PC and the like) may be associated with one user.

The network 600 may connect the server 100, the communication terminal 200, and the various facilities 310 to 330 to each other. The network 600 may include a wireless network and a wired network. For example, more specifically, the network 600 may be a wireless LAN (WLAN), a wide area network (WAN), integrated service digital networks (ISDNs), wireless LANs, a mobile communication system of code division multiple access (CDMA), long term evolution (LTE), LTE-Advanced, 4th generation communication (4G), 5th generation communication (5G), or 6th generation communication (6G) or subsequent generations or the like. The network 600 is not limited to such examples and, for example, may be a public switched telephone network (PSTN), Bluetooth (registered trademark), an optical circuit line, an asymmetric digital subscriber line (ADSL), a satellite communication network or the like. In addition, the network 600 may be a combination of these.

The storage device 500 may store (load) various kinds of information (data) used by the information processing system 800. In FIG. 1, although only one storage device 500 is illustrated separately from the server 100, the storage device 500 may be integrated with the server 100 and may be composed of a plurality of storage devices. In addition, a storage unit 170 of the server 100 to be described below may be configured using the storage device 500.

In a conventional technology, there are instances in which an air conditioner and a lamp cannot be turned on before unlocking of a conference room or the like, and a user is caused to have inconvenience. In addition, in buildings of recent years in which a plurality of tenants or companies reside, there are instances in which various security facilities used to prevent entry of persons other than related persons are installed in a living room and a company-dedicated space inside the building for security. Thus, for example, when a shared space inside the building is used or when a dedicated space such as a conference room is shared among companies, it may be necessary to appropriately release the security facilities described above or set the air conditioning facility. To release or set these various facilities, a degree of convenience is low for both a manager and a user, if entry of a manager, a security guard, or the like having authority to control the facilities is necessary.

In contrast to this, according to an information processing system according to one example, facilities of which control performed by an unauthorized user is restricted can be controlled seamlessly by a user in accordance with a use reservation for a use target without requiring presence of a manager, a security guard, or the like. In other words, according to one example, a facility control platform that can improve usability can be provided.

Server

Figure 2:
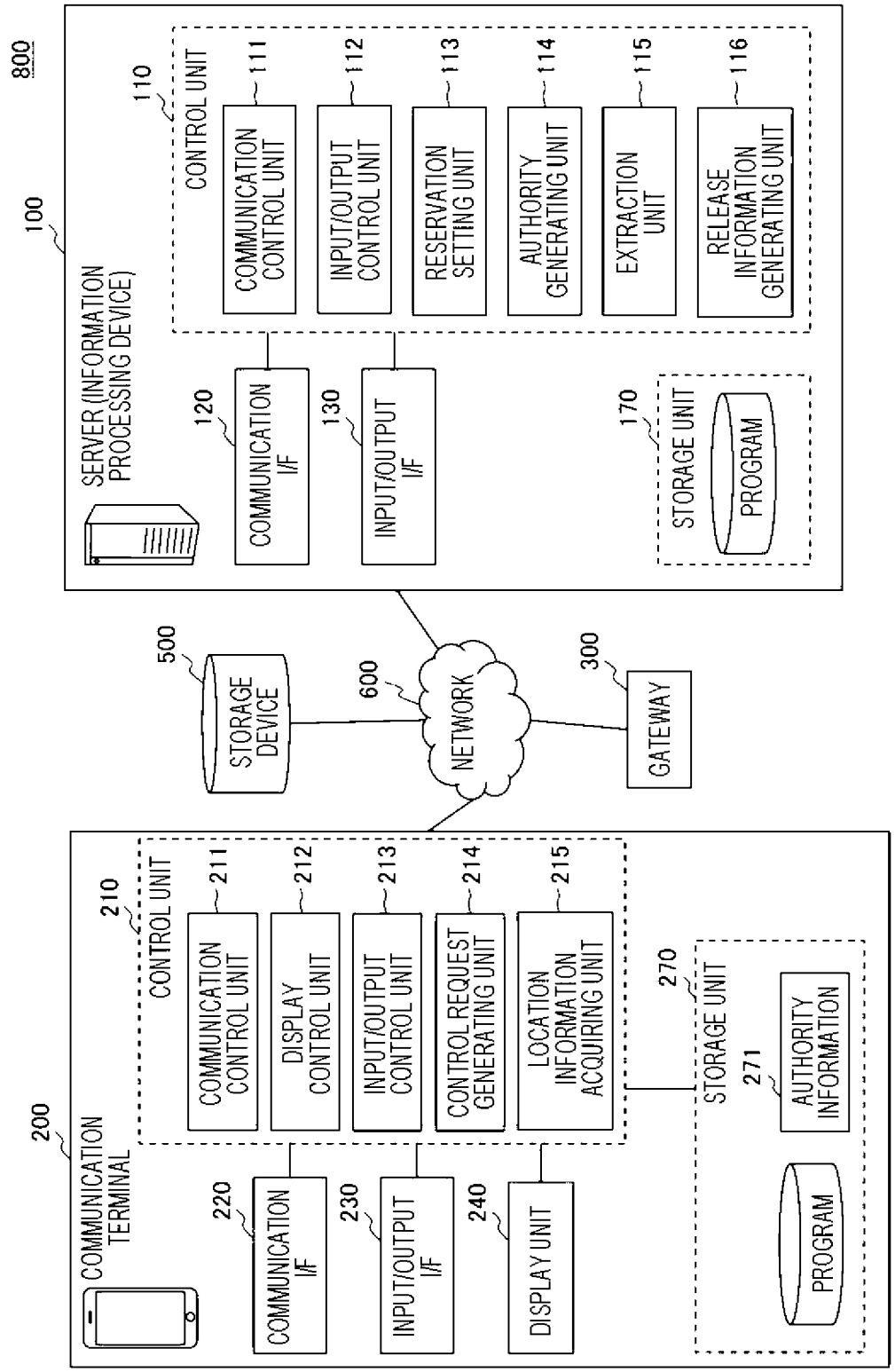
FIG. 2 is an example of a functional block diagram of a server (an information processing device) and a communication terminal (a user terminal) in the information processing system according to the first example.

A hardware configuration and a functional configuration of a server (the information processing device) 100 according to an example will be described with reference to FIG. 2.

(1) Hardware Configuration of Server

The server 100 includes a control unit 110, a communication interface (I/F) 120, an input/output I/F 130, and a storage unit 170. In addition, the server 100 may further include a display not illustrated in the drawing.

Typically, the control unit 110 may be a central processing unit (CPU). The control unit 110 may read a program stored in the storage unit 170 and execute functions and methods disclosed in each example by executing codes or commands included in the read program. Other than this, the control unit 110 may include a micro processing unit (MPU), a graphics processing unit (GPU), a microprocessor, a processor core, a multiprocessor, an application-specific integrated circuit (ASIC), a field programmable gate array (FPGA), for example. The control unit 110 may embody each process disclosed in each example using a logical circuit (hardware) and a dedicated circuit formed in an integrated circuit (IC) chip, a large scale integration (LSI), or the like. In addition, such circuits may be embodied using one or a plurality of integrated circuits, and a plurality of processes disclosed in each example may be embodied using one integrated circuit. The LSI may be also referred to as a VLSI, a super LSI, an ultra-LSI, or the like in accordance with a difference in the degree of integration.

The storage unit 170 stores various programs and various kinds of data that are required for operating the server 100. For example, the storage unit 170 may include a hard disk drive (HDD), a solid state drive (SSD), a flash memory, and the like. In addition, the storage unit 170 may include a memory (a random access memory (RAM) and a read only memory (ROM), for example) providing a work area for the control unit 110.

The communication I/F 120 may be mounted as hardware such as a network adaptor, communication software, and a combination thereof. The communication I/F 120 may transmit/receive various kinds of data via the network 600. This communication may be performed in a wired manner or a wireless manner, and any communication protocol may be used as long as mutual communication can be performed. The communication I/F 120 may communicate with the communication terminal 200 via the network 600. The communication I/F 120 may transmit various kinds of data to the communication terminal 200 and an authentication device to be described below as necessary in accordance with an instruction from the control unit 110. In addition, the communication I/F 120 may receive various kinds of data transmitted from the communication terminal 200 and an authentication device and transmit the data to the control unit 110. The communication I/F 120 may be simply represented as a communication unit. In addition, when the communication I/F 120 is configured by a physically-structured circuit, it may be referred to as a communication circuit.

The input/output I/F 130 may include an input device that inputs various operations for the server 100 and an output device that outputs a result of processing performed by the server 100. In the input/output I/F 130, the input device and the output device may be integrated, or the input device and the output device may be separate from each other. The input device may be embodied by any one of all kinds of devices that can accept an input from a user and transmit information relating to this input to the control unit 110 or a combination thereof. For example, the input device may include a hardware key such as a touch panel, a touch display, or a keyboard, a pointing device such as a mouse, a camera, and a microphone. The output device may output a result of processing performed by the control unit 110. For example, the output device may include a touch panel, a speaker, and the like.

(2) Functional Configuration of Server

The server 100 may include a communication control unit 111, an input/output control unit 112, a reservation setting unit 113, an authority generating unit 114, and an extraction unit 115 as functions embodied by the control unit 110. Each functional unit illustrated in FIG. 2 is not essential, and functional units that are not essential may be absent in each example described below. In addition, a function or processing of each functional unit may be embodied using machine learning or artificial intelligence (AI) in a range that can be embodied.

The communication control unit 101 may control communication between the communication terminal 200 and the gateway 400 through the communication I/F 110. The input/output control unit 112 may control transmission of various kinds of information to an external device through the input/output I/F 130. For example, the input/output control unit 112 may transmit information to each functional unit from an input device such as a touch panel, a keyboard, or a microphone not illustrated in the drawing in accordance with an input instruction from a manager of the server 100 or transmit information from each functional unit to an output device such as a touch panel, a monitor, or a speaker not illustrated in the drawing.

The reservation setting unit 113 may set a use reservation for a use target on the basis of a use request for the use target. More specifically, the reservation setting unit 113 may set a use reservation on the basis of vacancy information of a use target stored in the storage device 500 in advance and a use request received from the communication terminal 200. The use request, for example, may include information of a use target desired to be used by a user, date and time at which the user desires to use the use target, and the like. The information included in the use request is not particularly limited, as long as the information is information that is necessary for a manager to operate a reservation service. For example, a manager may provide arbitrary information that is necessary for operating a reservation service for a user in advance. The vacancy information, for example, may include information of a use target that can be reserved, a date and time at which the use target can be used and the like. The information included in the vacancy information is not particularly limited as long as the information is information necessary for a manager to operate a reservation service.

The reservation setting unit 113 may cause the storage device 500 to store information about a use reservation (reservation information) for a use target. The reservation information, for example, may include information of a date and time at which a user has made a reservation for use of a use target (reservation date and time), information about a user who has made a reservation for use of a use target (using user information) and the like. In addition, the information included in the reservation information is not particularly limited as long as the information is information necessary for a manager to operate a reservation service. For example, the reservation setting unit 113 may cause the storage device 500 to store reservation information at least including a reservation date and time for a use target and using user information about a using user.

Various kinds of information stored in the storage device 500 will be described. Various kinds of information stored in the storage device 500 is not limited to information described below. FIG. 3 is an example of a user information table relating to users using a reservation service provided by the information processing system 800. A data set including various kinds of information stored in the storage device 500 may be referred to as a "table." In addition, a table may be distinguished using information included therein. In other words, for example, a user information table TB10 and a use target information table TB20 described below may be understood as data sets including mutually-different information.

The storage device 500 may store a data set in which a user name, a terminal ID of a communication terminal, a mail address, a company ID, a belonging information and the like associated with a user are associated with a user identifier (ID) that is an identifier used for identifying each user as the user information table TB10. Among the items described above, the "company ID" may be an identifier used to identify a company to which a user belongs. In addition, the "belonging information" may be information about a user's belonging department inside a company to which the user belongs. The user information table TB10 illustrated in FIG. 3 is one example, and information stored in the storage device 500 may be more than or less than that described above.

FIG. 4 is an example of a use target information table for a use target. In FIG. 4, although an example in which the use target information table is stored for each company ID managing and using a use target is illustrated, the form of the table is not limited thereto.

In the use target information table TB20, a "place name" may be a name of a place at which a use target is present. In the example illustrated in FIG. 4, as the "place name," a name and the number of stories of a building in which a use target is present are illustrated. In addition, the place name may not be a name of a place, as long as it is information that can be used by the server 100 for identifying a place in which a use target is present, or the place name may not be stored. A "section ID" may be an identifier used to identify each section when a place in which a use target or a facility is included is divided for each predetermined section. For example, the predetermined section may be a section (area) used by each company in one floor. Alternatively, for example, the predetermined section may be a section secured by one security facility. Alternatively, for example, the predetermined section may be a section in which lighting facilities controlled by one lighting switch are installed. A "use target ID" may be an identifier used to identify each use target. A "facility ID" may be an identifier used for identifying each facility. "Location information" may be information about a location of a use target or a facility. In the example illustrated in FIG. 4, although the location information is stored in association with a place name, the location information may be stored in association with a use target ID or a section ID. In addition, as the use target information table, in the example illustrated in FIG. 4, although one table is stored for a plurality of companies, the configuration is not limited thereto. For example, in the use target information table, a place name, a section ID, a facility ID and the like may be stored in association with each use target ID. Alternatively, a use target ID, a place name, a section ID, a facility ID and the like may be stored in association with each facility ID. The use target information table illustrated in FIG. 4 is one example, and the form of the use target information table may be any as long as association between a use target and facility can be identified by the server 100. In addition, the information illustrated in FIG. 4 is not essential, and stored information may be less than this, and any other information may be stored.

Referring to the use target information table TB20, first, in one aspect, a company of which a company ID is "com_**" owns use targets of which use target IDs are identified at least by "obj_001", "obj_002", and "obj_003" in a section that is identified by a section ID "zone_2S" of a place name "2nd floor of 00 building." In addition, facilities of which facility IDs are identified at least by "eqi_air_001", "eqi_light_001", and "eqi_shade_001" are associated with a use target ID "obj_001." Furthermore, facilities identified by "elv_001" and "elv_002" are associated with the use target ID "obj_001." Although details will be described below, facilities identified by facility IDs "eqi_air_," "eqi_light_," "eqi_shade_" and "elv_" respectively represent an air conditioning facility, a lighting facility, a sunshade facility, and a movement facility (an elevator). The identifiers described above are examples for simplifying description, and inclusion of "eqi_air_," "eqi_light_," "eqi_shade_," "elv_" and the like in the identifiers is not essential. Similarly, the use target information table TB20 may be configured such that a facility ID of a facility associated with a use target identified by a use target ID is associated with the use target ID of a use target disposed in a section identified by each section ID. In addition, the use target information table TB20 may include location information of each place. Although omitted in FIG. 4, the use target information table TB20 may include information about all use target IDs that can be reserved.

FIG. 5 is an example of a facility information table storing facility information that is information about facilities installed inside a building. The facility information table TB30 may be a table relating to air conditioning facilities. The storage device 500 may store a data set in which a unique number and an Internet protocol (IP) address are associated with each facility ID as the facility information table TB30. In addition, the table TB31 may be a table relating to lighting facilities. The storage device 500 may store a data set in which a unique number and an IP address are associated with each facility ID as the table TB31. FIG. 5 is an example, and the information stored in the storage device 500 is not limited thereto. In addition, facility information about all the facilities controlled by the server 100 may be stored in the storage device 500. In other words, information about sunshade facilities, movement facilities and the like in addition to the air conditioning facilities and the lighting facilities may be stored in the storage device 500. Although an IP address is necessary for the server 100 to transmit a control signal to a control target, in a configuration in which Non-IP data delivery (NIDD) that is a communication standard not using any IP address is used, the network address may not be stored in the storage device 500. The facility information tables TB30 and TB31 illustrated in FIG. 5 are examples, and the information stored in the storage device 500 may be more than or less than that.

FIG. 6 is an example of a reservation information table relating to a use reservation for a use target. The storage device 500 may store a data set in which a user ID of a user who has made the use reservation (reservation user ID), a reservation year, month, and date, a reservation time frame, a use target ID, a user ID of a using user set in a use reservation as a person using a use target (user ID) and the like are associated with a reservation ID used for identifying each reservation as a reservation information table TB40. The reservation information table TB40 illustrated in FIG. 6 is an example, and the information stored in the storage device 500 may be more than or less than this.

Referring back to FIG. 2, the description of the functions will be continued. The authority generating unit 114 may generate information about provisional authority (authority information) used to control facilities relating to a use target via the network 600 among facilities in the building on the basis of reservation information stored in the storage device 500. The "provisional authority" may represent temporary authority that is valid only for a predetermined period. In other words, a user having provisional authority can use a predetermined use target for a predetermined period on the basis of the provisional authority. In addition, the predetermined period may be set on the basis of reservation information. Hereinafter, as an example, when the authority generating unit 114 generates authority information on the basis of the use target information table TB20 illustrated in FIG. 4, the facility information tables TB30 and TB31 illustrated in FIG. 5, the reservation information table TB40 illustrated in FIG. 6 and the like will be described.

For example, the authority generating unit 114 may generate provisional authority to control facilities relating to a use target identified by a use target ID "obj_001" for users identified by user IDs "user_B," "user_C," "user_W" and "user_N" for a reservation time frame of "15:00 to 16:30" of a reservation year, month, and date "2020/7/8" via the network 600 for a use reservation of a reservation ID "rsv_001" by referring to the reservation information table TB40 illustrated in FIG. 6. In other words, authority for controlling facilities relating to a use target identified by a use target ID "obj_001," which is valid only for a period of 2020/7/8 15:00 to 16:30, may be given to users. The authority information will be described below.

The communication control unit 111 may perform a process of transmitting authority information generated by the authority generating unit 114 to the communication terminal 200 through the communication I/F 120. In other words, the communication control unit 111 may transmit authority information generated by the authority generating unit 114 to the communication terminal 200. For example, when a period to a reservation date and time is within a predetermined threshold, the communication control unit 111 may transmit authority information to the communication terminal 200 of a user included in the reservation information. For example, in a use reservation of a reservation ID "rsv_001" illustrated in FIG. 6, the reservation year, month, and date is "2020/7/8," and the reservation time frame is "15:00 to 16:30," and thus the communication control unit 111 may transmit authority information to the communication terminals 200 of users identified by user IDs "user_B," "user_C," "user_W" and "user_N" at 14:50 on 2020/7/8 that is 10 minutes before the reservation. In the example described above, although the predetermined threshold is set as "10 minutes", the predetermined threshold is not limited thereto, may be 5 minutes or 20 minutes, or may be set differently for each reservation ID. In addition, the communication control unit 111 may have a function of transmitting a control request received from the communication terminal 200 to a facility requesting control, which is included in a control request, through the communication I/F 120. Details of this function will be described below.

The extraction unit 115 may extract facilities installed in a path to a use target in the building 300 and a facility installed as the use target described above as facilities relating to the use target. "The path to the use target" may be a path from an entrance of the building 300 to a use target. The path to the use target may be set in advance on the basis of floor information and arrangement information of elevators not illustrated in the drawing. The storage device 500 may store the path to the use target. The path to the use target may be defined by a combination of a section ID and, for example, a facility ID of a movement facility (an elevator) included in the facility information. In such a configuration, the extraction unit 115 may extract facilities relating to a use target by reading a section ID and facility IDs defining a path to a use target stored in the storage device 500 and reading facility IDs associated with the section ID by referring to the use target information table TB20. For example, for a use reservation of a reservation ID "rsv_001" illustrated in FIG. 6, the extraction unit 115 may extract facilities of which facility IDs are identified as "eqi_air_001," "eqi_light_001" and "eqi_shade_001" as facilities relating to a use target identified by the use target ID "obj_001" by referring to the use target information table TB20 illustrated in FIG. 4. In addition, the extraction unit 115 may extract movement facilities of which facility IDs are identified as "elv_001" and "elv_002" as facilities installed in a path to the use target ID "obj_001." In addition, a technique for extracting facilities installed in a path to a use target and facilities installed in the use target is not limited to that described above. Furthermore, an arbitrary technique may be used as long as the technique is capable of extracting facilities installed in a path up to a use target or facilities installed in the use target.

In addition, the authority generating unit 114 may generate information used for connection to facilities of which facility IDs are "eqi_air_001," "eqi_light_001," "eqi_shade_001," "elv_001" and "elv_002" (connection information) extracted by the extraction unit 115 as authority information about provisional authority by referring to the facility information tables TB30, TB31 and the like illustrated in FIG. 5. For example, the connection information may include information of IP addresses such as a network address and the like. In addition, the authority information is a time-limited equation, and the authority generating unit 114 may delete or invalidate authority information from the storage unit 170 after a predetermined time from an end time of a reservation.

Communication Terminal

Next, a hardware configuration and a functional configuration of the communication terminal 200 according to one example will be described with reference to FIG. 2.

(1) Hardware Configuration of Communication Terminal

The communication terminal 200 includes a control unit 210, a communication I/F 220, an input/output I/F 230, a display unit 240, and a storage unit 270.

Typically, the control unit 210 may be a central processing unit (CPU). The control unit 210 may read a program stored in the storage unit 270 and execute functions and methods disclosed in each example by executing codes or commands included in the read program. In addition, thereto, the control unit 210 may include a micro processing unit (MPU), a graphics processing unit (GPU), a microprocessor, a processor core, a multiprocessor, an application-specific integrated circuit (ASIC), a field programmable gate array (FPGA), and the like. The control unit 210 may embody each process disclosed in each example using a logical circuit (hardware) and a dedicated circuit formed in an integrated circuit (IC) chip, a large scale integration (LSI) or the like. In addition, such circuits may be embodied using one or a plurality of integrated circuits, and a plurality of processes disclosed in each example may be embodied using one integrated circuit. The LSI may be also referred to as a VLSI, a super LSI, an ultra-LSI, or the like in accordance with a difference in the degree of integration.

The storage unit 270 stores various programs and various kinds of data that are required to operate the communication terminal 200. For example, the storage unit 270 may include a hard disk drive (HDD), a solid state drive (SSD), a flash memory, and the like. In addition, the storage unit 270 may include a memory (a random access memory (RAM), a read only memory (ROM) and the like) providing a work area for the control unit 210.

The communication I/F 220 may be mounted as hardware such as a network adaptor, communication software, and a combination thereof. The communication I/F 220 may transmit/receive various kinds of data via the network 600. This communication may be performed in a wired manner or a wireless manner, and any communication protocol may be used as long as mutual communication can be performed. The communication I/F 220 may communicate with the server 100 via the network 600. The communication I/F 220 may transmit various kinds of data to the server 100 and an authentication device to be described below as necessary in accordance with an instruction from the control unit 210. In addition, the communication I/F 220 may receive various kinds of data transmitted from the server 100 or an authentication device and transmit the data to the control unit 210. The communication I/F 220 may be simply represented as a communication unit. In addition, when the communication I/F 220 is configured by a physically-structured circuit, it may be referred to as a communication circuit.

The input/output I/F 230 may include an input device that inputs various operations for the communication terminal 200 and an output device that outputs a result of processing performed by the communication terminal 200. In the input/output I/F 230, the input device and the output device may be integrated, or the input device and the output device may be separate from each other. The input device may be embodied by any one of all kinds of devices that can accept an input from a user and transmit information relating to this input to the control unit 210 or a combination thereof. For example, the input device may include a hardware key such as a touch panel, a touch display, or a keyboard, a pointing device such as a mouse, a camera, and a microphone. The output device may output a result of processing performed by the control unit 210. For example, the output device may include a touch panel, a speaker and the like.

The display unit 240 is a monitor that displays data in accordance with display data written in a frame buffer and, for example, may be a liquid crystal display, an organic electroluminescence display (OLED), a head mounted display (HDM) or the like.

(2) Functional Configuration of Communication Terminal

Next, the functional configuration of the communication terminal 200 will be described. The communication terminal 200 may include a communication control unit 211, a display control unit 212, an input/output control unit 213, a control request generating unit 214, and a location information acquiring unit 215. Each functional unit illustrated in FIG. 2 is not essential, and functional units that are not essential may be absent in each example described below. In addition, a function or processing of each functional unit may be embodied using machine learning or artificial intelligence (AI) in a range that can be embodied.

The communication control unit 211 controls communication between the communication terminal 200 and an external device (the server 100) via the network 600 through the communication I/F 220 and performs transmission/reception of various kinds of information. In other words, the communication control unit 221 may transmit a use request for a use target disposed in the building 300 to the server 100 through the communication I/F 220. In addition, the communication control unit 211 may receive authority information about provisional authority from the server 100 through the communication I/F 220. The display control unit 212 may control display of data in the display unit 230. The input/output control unit 213 may accept an input operation from a user through the input/output I/F 230 such as a keyboard, a touch panel, or a microphone. In addition, the input/output control unit 213 may output information from each functional unit by controlling an output device such as a touch panel, a monitor, or a speaker.

Figure 7:
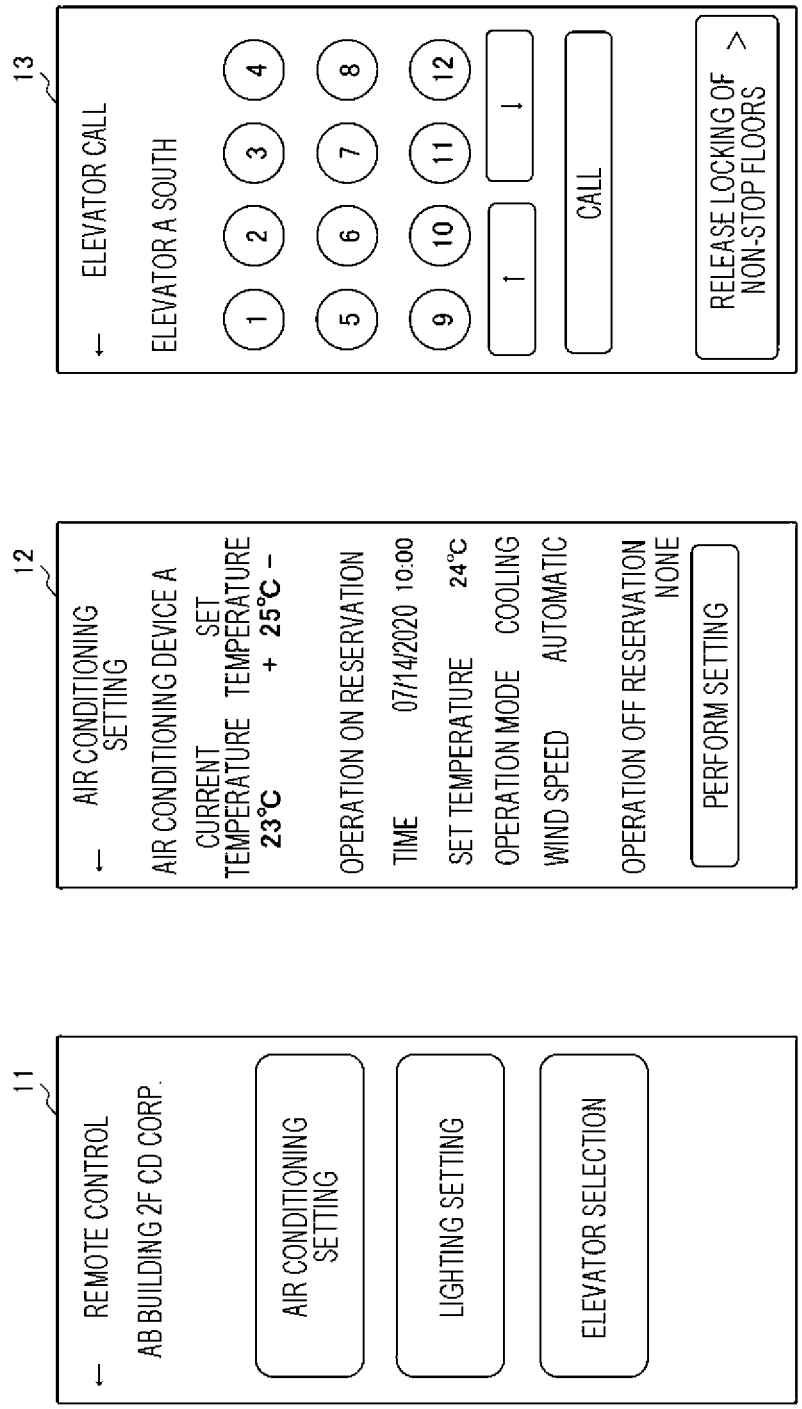
FIGS. 7A to 7C are diagrams illustrating examples of a display screen of a user terminal in the information processing system according to the first example.

The display control unit 212 may display information relating to facilities relating to a use target that can be controlled by a user on the display unit 240 on the basis of the provisional authority received from the server 100. As described above, in the provisional authority, information about a use target that can be controlled for a predetermined period on the basis of the reservation information by a user of the communication terminal 200 may be included. FIGS. 7A to 7C illustrate an example of an input screen of a control request displayed on the display unit 240 by the display control unit 212. The input screen illustrated in FIGS. 7A to 7C is an example and is not limited thereto. FIG. 7A is an example of a screen 11 accepting selection of a target, for which a control request is generated, from a user. The display control unit 212 can display the screen 11 for a use target that can be controlled via the network 600 on the basis of provisional authority received from the server 100. In the example illustrated in FIG. 7A, for a company "AB building 2F CD Corp.," it can be understood that air conditioning, setting of lighting, and selection of an elevator can be performed. In other words, in this example, a user has provisional authority for air conditioning, lighting, and elevators and can select a facility to be controlled by operating a display screen.

FIG. 7B is an example of a screen 12 displaying items that can be controlled by a user for a target for which a control request is generated. FIG. 7B illustrates a screen for performing setting of an air conditioning device that is displayed when "air conditioning setting" is selected by a user in FIG. 7A as an example of the screen 12. In other words, the air conditioning device may be controlled in accordance with a user's input operation on an item displayed on the screen 12. The input/output I/F 230 may function as an acceptance unit that accepts an input of control from a user. In other words, a user, for example, in an air conditioning device, inputs settings such as a time at which the power of an air conditioning device is turned on, a temperature, an operation mode, a wind speed, and the like on the screen 12 and can perform the setting using the communication terminal 200. In addition, a screen displayed in the communication terminal 200 may be on the basis of authority information received from the server 100. For example, when a setting temperature is restricted in the authority information, the setting temperature that can be input by the communication terminal 200 is restricted. More specifically, for example, when the setting temperature that can be input is restricted to 24 degrees to 28 degrees in the authority information, a user can set the temperature in the range of 24 degrees to 28 degrees. In addition, for example, when the setting of a wind speed is restricted in the authority information, an item relating to the wind speed may not be displayed on the display screen. In other words, on the display screen, only items that can be controlled by a user may be displayed.

FIG. 7C is an example of a screen 13 on which items that can be controlled by a user are displayed for a target for which a control request is generated. FIG. 7C illustrates a screen used to operate an elevator, which is displayed when "elevator selection" is selected by a user in FIG. 7A, as one example of the screen 13. In other words, for example, an elevator may be controlled in accordance with an item selected by a user among items displayed on the screen 13. In other words, a user can perform selection of a destination floor and cage calling for the elevator using the communication terminal 200. For example, a user can designate a destination floor of the elevator by pressing a floor number having uses among floor numbers (for example, 1 to 12) displayed on the screen 13. In addition, by selecting "calling," a user can call the elevator, for example, to a common space that is an entrance of the building 300 or a current floor. Furthermore, the screen displayed in the communication terminal 200 may be based on authority information received from the server 100. For example, when a destination floor of a user is restricted in the authority information, a destination floor that can be input using the communication terminal 200 may be restricted. In the example illustrated in FIG. 7C, floor numbers of which locking as non-stop floors are released based on the authority information and can be selected are displayed in white. In other words, in the example illustrated in FIG. 7C, a user can select 6th to 8th floors as destination floors. In addition, on the display screen, only floor numbers that can be selected by a user may be displayed.

The control request generating unit 214 may generate a control request for each facility on the basis of a user's input on the screens 11 to 13. In other words, the control request generating unit 214 may generate a control request to request predetermined control of a facility relating to a use target on the basis of provisional authority received from the server 100. As described above, the predetermined control may be control according to setting items that are allowed to be selected and input by a user. For example, predetermined control for an air conditioning facility may be control of a temperature, a time at which the air conditioning device starts to operate, an air quantity, and a mode of cooling, heating, and the like. In addition, for example, predetermined control for an elevator may be selection or a destination floor and cage calling. For example, predetermined control for a lighting facility may be selection of light to be turned on, a time at which lighting is turned on, and the like. In other words, in a control request, information used for performing the predetermined control described above for a control target may be included. In addition, the screens 11 to 13 illustrated in FIGS. 7A to 7C may be displayed in the communication terminal 200 of a participating user that has received authority information about provisional authority. In other words, the control request generating unit 214 may generate a control request in accordance with selection of each participating user.

The communication control unit 211 may transmit a control request generated by the control request generating unit 214 to the server 100 through the communication I/F 220. In the control request, connection information may be included for designating a facility that is a control target included in authority information. In other words, for example, the communication control unit 111 of the server 100 may transmit a control request to a facility designated by a network address on the basis of the network address included in a control request.

In this way, according to one example, a user can control a use target using the communication terminal 200 held by him or her. In other words, according to one example, a system having a high degree of convenience can be provided.

The storage unit 270 may store various programs and various kinds of data that are necessary for the communication terminal 200 to operate. For example, the communication terminal 200 may store an application program used for using a reservation service. In addition, the storage unit 270 may store authority information 271 of a limited-time type transmitted to the communication terminal 200. The location information acquiring unit 260 may acquire location information about a current location of its own terminal inside the building 300. The location information acquiring unit 215, for example, by using a global positioning system (GPS), may acquire information of latitude and longitude of the communication terminal 200 as location information of a current location of the communication terminal 200. In addition, the location information acquiring unit 215 may acquire location information using an arbitrary technique. The location information acquiring unit 215 may acquire location information, for example, by using a wireless LAN, an Indoor MEssaging system (IMES), a Radio Frequency Identifier (RFID), a Bluetooth Low Energy (BLE), a geomagnetism or the like. The location information acquiring unit 215 will be described below.

Control Flow of Information Processing System

Next, each of processes performed by the server 100 and the communication terminal 200 in the information processing system 800 according to one example will be described with reference to a sequence diagram illustrated in FIG. 8.

Figure 8:
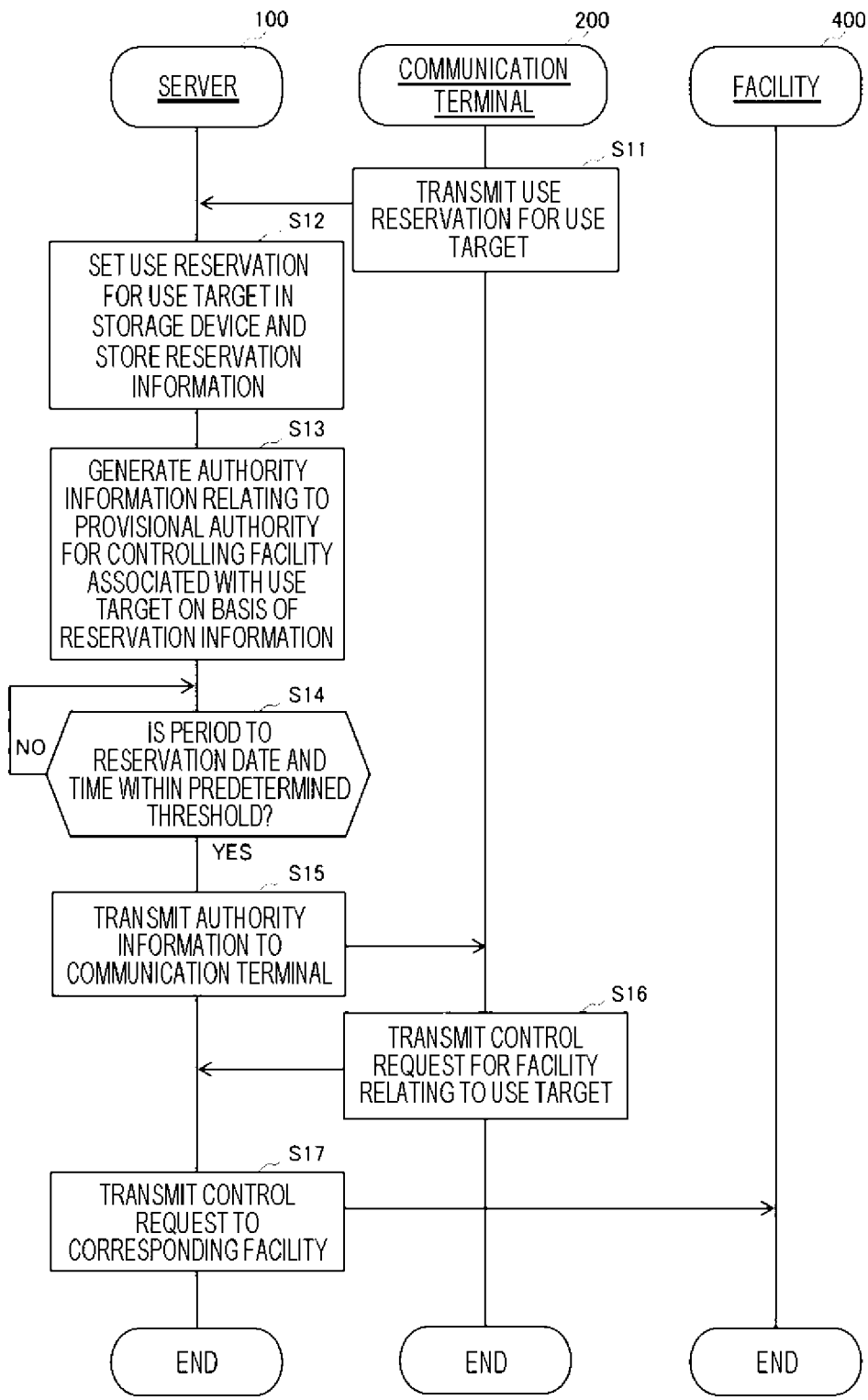
FIG. 8 is a sequence diagram of a server, a communication terminal, and a facility according to the first example.

First, although not illustrated in FIG. 8, the storage device 500 may store a user information table TB10, a use target information table TB20, facility information tables TB30 and TB31, and the like. The server 100 may perform the following processes by appropriately referring to the user information table TB10, the use target information table TB20, the facility information tables TB30 and TB31, and the like stored in the storage device 500.

The communication control unit 211 of the communication terminal 200 may transmit a use request for requesting a use reservation for a use target to the server 100 using the communication I/F 220 (Step S11). The reservation setting unit 113 of the server 100 may set a use reservation for a use target and store reservation information in the storage device 500 (Step S12). In other words, in the storage device 500, the reservation information table TB40 may be stored. Next, the authority generating unit 114 of the server 100 may generate authority information about provisional authority used for controlling facilities relating to a use target on the basis of the reservation information (Step S13). Thereafter, the server 100 may determine whether or not a period to a reservation date and time is within a predetermined threshold (Step S14). When the period to the reservation date and time is within the predetermined threshold (Yes in Step S14), the communication control unit 111 may transmit the authority information generated by the authority generating unit 114 to the communication terminal 200 (Step S15). On the other hand, when the period to the reservation date and time is not within the predetermined threshold (No in Step S14), the server 100 may determine whether or not the period to the reservation date and time is within the predetermined threshold again (Step S14). In other words, transmission of authority information may be held until the period to the reservation date and time becomes within the predetermined threshold.

The control request generating unit 214 of the communication terminal 200 may generate a control request for facilities relating to a use target on the basis of authority information. The communication control unit 211 may transmit a control request to the server 100 by controlling the communication I/F 220 (Step S16). The communication control unit 111 of the server 100 may transmit a control request to a facility designated in connection information on the basis of the connection information included in the control request received from the communication terminal 200 (Step S17).

In this way, according to one example, provisional authority for which a use target can be controlled in a time-limited type is generated on the basis of a reservation for the use target and is transmitted to the communication terminal 200. Thus, the user who has made the reservation can adjust air conditioning and lighting of the use target that has been reserved via the network 600 before start of use of the use target. In other words, according to one example, a system having high usability can be provided. In addition, according to one example, when a time to a use time becomes within a predetermined threshold, the provisional authority is transmitted to the communication terminal 200. In other words, facilities relating to a use target are not controlled unnecessarily from an unauthorized user. For this reason, according to one example, security can be improved.

In addition, facilities installed in a path to a use target that has been reserved for use are extracted by the server 100, and a using user can be allowed to control the facilities on the path in advance. Thus, the using user can call an elevator in advance or stop an alarm, a gate and the like installed in a passage through which the user passes at the time of going toward a use target.

In addition, a control request may be automatically generated in accordance with location information of the communication terminal 200 without using a user's input and be transmitted to the server 100. In other words, the control request generating unit 214 of the communication terminal 200 may generate a control request for facilities relating to location information among facilities relating to a use target on the basis of the location information and the provisional authority. In addition, the communication control unit 211 may transmit the control request to the server 100.

First, when location information of the communication terminal 200 is acquired by a beacon transmitter (a signal terminal) installed in a building will be described. FIG. 9 is an example of an elevator information table TB50 relating to elevators. The storage device 500 may store a data set in which a section ID, a beacon ID, and location information are associated with an elevator ID used for identifying an elevator as the elevator information table TB50. The table illustrated in FIG. 9 is an example, and location information of each elevator may not be essential. In addition, information stored in the storage device 500 may be more than or less than this. In one example, a beacon transmitter may be disposed in each elevator hall of each floor inside the building 300. Thus, in the elevator information table TB50, a beacon ID used to identify an individual beacon transmitter installed in an elevator hall may be associated with each elevator. In addition, also for the same elevator, when a beacon transmitter is different in accordance with a different floor, a different beacon signal may be associated therewith. The authority generating unit 114 of the server 100 may generate authority information including information about a beacon ID relating to an elevator relating to a use target. The communication terminal 200 may store the received authority information in the storage unit 270.

For example, the control request generating unit 214 may generate a control request used for controlling an elevator on the basis of a beacon ID included in the beacon signal and the authority information. For example, the control request generating unit 214 may generate a control request for an elevator that becomes controllable using the provisional authority on the basis of a beacon ID included in the beacon signal and the authority information. More specifically, first, the location information acquiring unit 215 of the communication terminal 200 may receive a beacon signal in an elevator hall. For example, the location information acquiring unit 215 is assumed to have received a beacon signal "1ghj.2hwe." In this example, the control request generating unit 214 may extract an elevator ID "elv_001" associated with the beacon signal "1ghj.2hwe" by referring to the elevator information table TB50. When the elevator ID "elv_001" is an elevator that becomes controllable using the provisional authority, the control request generating unit 214 may generate a control request for calling the elevator identified by the elevator ID "elv_001" to an elevator hall. Then, the generated control request may be transmitted to the server 100. In other words, in one example, elevators may be controlled without using a user's operation on the communication terminal 200. In this way, according to one example, a system having a high degree of convenience can be provided for a user. In addition, control based on a beacon ID is not limited to elevators and may be applied to flapper gates. In other words, a beacon transmitter may be installed in a section in which each flapper gate is installed, and the control as described above may be performed. More specifically, for example, first, the location information acquiring unit 215 of the communication terminal 200 may receive a beacon signal near a flapper gate. By referring to a data set in which a flapper gate, a beacon signal, and a section ID not illustrated in the drawing are associated with other, the control request generating unit 214 may extract a flapper gate associated with a received beacon signal. When the extracted gate is a flapper gate that becomes controllable using provisional authority, the control request generating unit 214 may generate a control request to open this flapper gate.

In addition, various facilities may be configured to be controlled in accordance with location information of the communication terminal 200. For example, a release information generating unit 116 may generate release information to release a restriction to a facility associated with location information among facilities relating to a use target on the basis of location information transmitted from the communication terminal 200. For example, the release information may be information that enables a user's direct operation on a facility of which control for an unauthorized user is restricted. The communication control unit 111 may transmit the release information to a facility associated with the location information. For example, the facility to which the release information has been transmitted may become able to perform direct control input for an input device included in the facility in accordance with the release information. In accordance with this, for example, a user can operate various facilities using hard keys such as a floor selection button disposed in an elevator, a remote controller of an air conditioning device installed in a use target, and open/close buttons of a window. In other words, according to one example, a degree of convenience of operations on various facility can be improved.

Second Example

Next, another example (second example) will be described. According to the second example, facilities inside a building 300 can be controlled using a communication terminal in which no application is installed. In the following description, in the second example, description of components that may be embodied using components similar to those according to the first example may be omitted.

Figure 10:
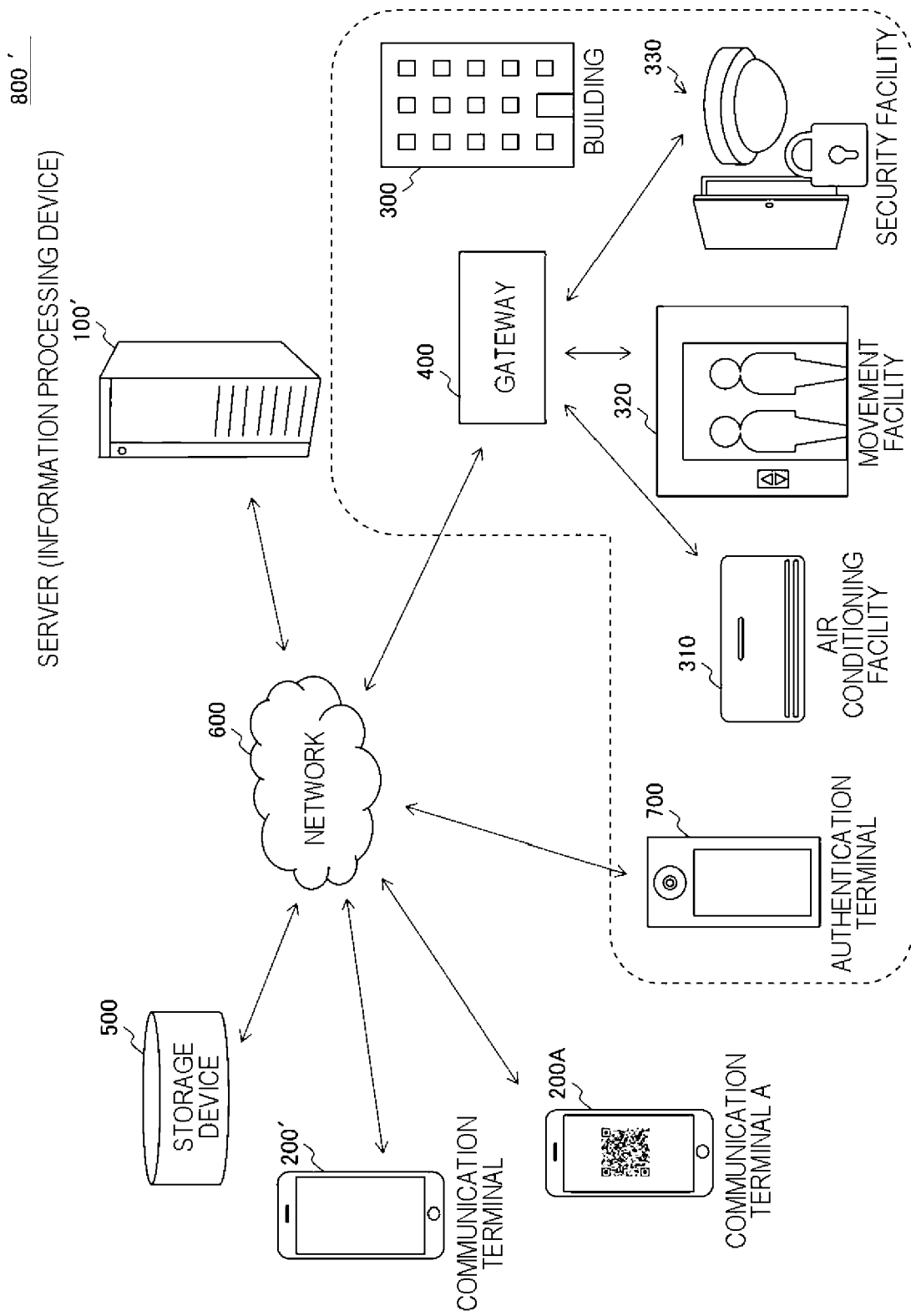
FIG. 10 is a schematic diagram of a configuration of an information processing system according to a second example.

FIG. 10 is a system configuration diagram of an information processing system 800' according to the second example. In FIG. 10, similar reference signs are assigned to components similar to those illustrated in FIG. 1. The information processing system 800' may include a server 100, a communication terminal 200, a gateway 400 that connects various facilities 310 to 330 installed inside a building 300 to a network 600, and a storage device 500. In addition, the information processing system 800' may further include a communication terminal 200A and an authentication terminal 700.

The communication terminal 200 may be a terminal of a user whose user information is stored in a user information table TB10 using a reservation service. The communication terminal 200A may be a terminal of a user (user A) not using a reservation service. The authentication terminal 700 is disposed in a movement facility or a security facility of the building 300 and authenticates a user. For example, the authentication terminal 700 may be installed in an elevator and restrict control of an elevator from an unauthorized user. In addition, the authentication terminal 700 may be installed in a flapper gate and restrict passage of an unauthorized user through the gate. The authentication terminal 700 may be associated with an electronic lock of a conference room of which use has been reserved by the user A. In other words, when the user has not been authenticated by the authentication terminal 700, entry of the user to the conference room may be restricted. In addition, the authentication terminal 700 may be embodied by an arbitrary communication terminal that can read authentication information to be described below. For example, the authentication terminal 700 may be a tablet terminal, s smartphone, or the like.

Functional Configuration

Figure 11:
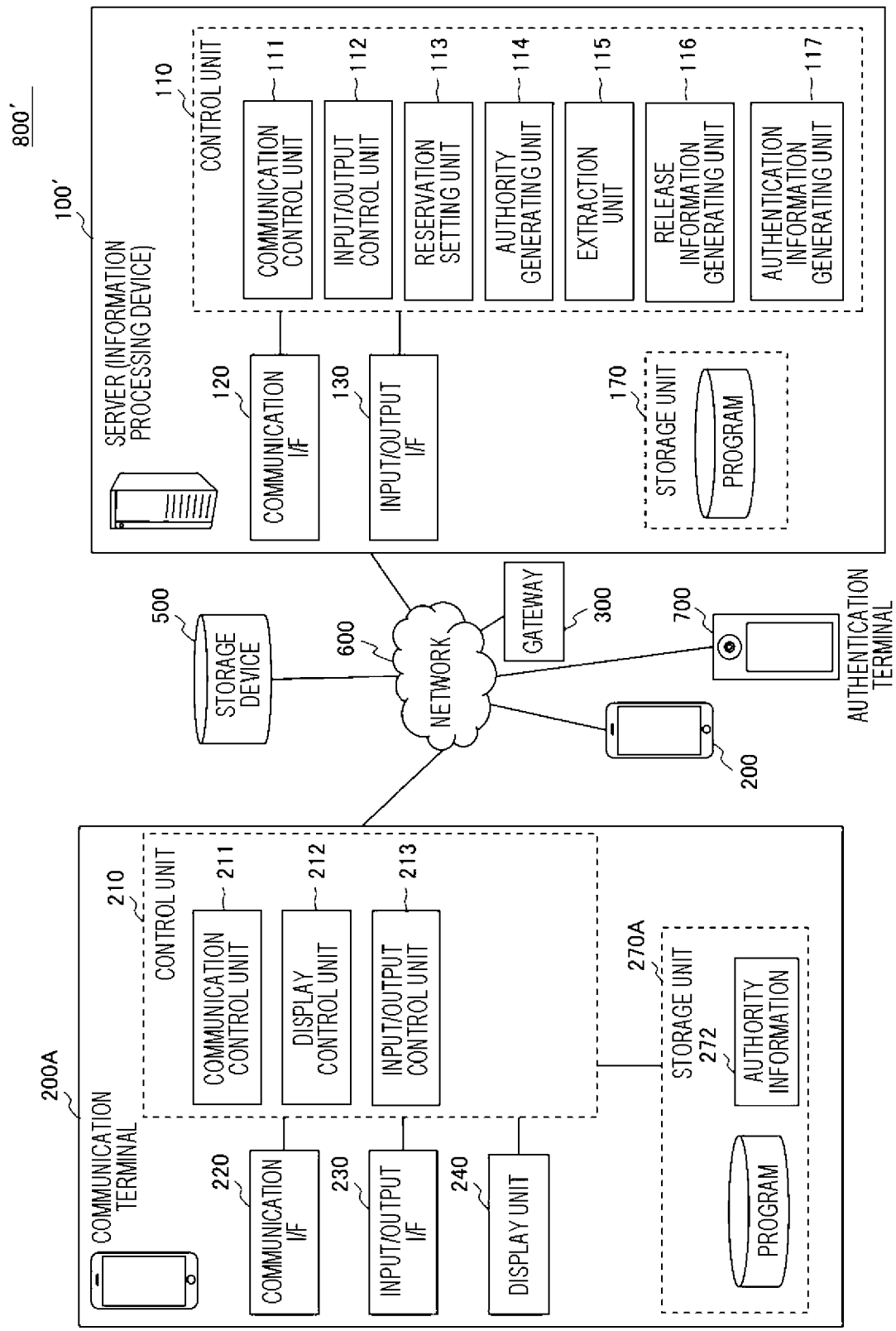
FIG. 11 is an example of a functional block diagram of a server (an information processing device) and a communication terminal (a user terminal) in the information processing system according to the second example.

Next, a functional configuration of the server 100 and a communication terminal 200B according to the second example will be described with reference to FIG. 11. Similar reference signs will be assigned to functional configurations similar to the functional configurations of the first example, and detailed description thereof may be omitted.

(1) Functional Configuration of Server

The server 100' may include a communication control unit 111, an input/output control unit 112, a reservation setting unit 113, an authority generating unit 114, an extraction unit 115, a release information generating unit 116, and an authentication information generating unit 117 as functions embodied by a control unit 110. Each functional unit illustrated in FIG. 11 may not be essential. In addition, in each example described below, functional units that are not essential may not be present. Furthermore, a function or processing of each functional unit may be embodied using machine learning or AI in a range that can be embodied.

In the second example, the communication terminal 200 may receive reservation information from the communication terminal 200A. In addition, the communication terminal 200 may transmit the reservation information received from the communication terminal 200A to the server 100'. For example, the reservation setting unit 113 of the server 100' may receive a use reservation for a use target using the communication terminal 200A from the communication terminal 200. In other words, according to the second example, a user A who has not completed user registration for a reservation service can make a use reservation for a use target inside the building 300 through the communication terminal 200 of a user who has completed user registration for the reservation service.

The reservation setting unit 113 may store reservation information about a use reservation from the communication terminal 200A in the storage device 500. For example, the reservation information may include a reservation year, month, and date on which a use target is to be used, a time frame, and user information (a telephone number, a mail address, or the like) of a using user. The authentication information generating unit 118 may generate authentication information used for authenticating the communication terminal 200A on the basis of reservation information. For example, the authentication information may be a two-dimensional code, a QR code (registered trademark), VeriCode, a CP code, an AztecCode, PDF417 or the like. In addition, the authentication information may be information used for face authentication based on a face image of a using user. Furthermore, the authentication information may be information that is generated using an arbitrary method that can be decoded by the authentication terminal 700 to be described below.

FIG. 12 is an example of a reservation information table stored in the storage device 500. The reservation information table TB60 may include a reservation date and time for a use target and using user information about a using user. In addition, the reservation information table TB60 may include an authentication ID used to identify authentication information. The communication control unit 111 may transmit authentication information to a using user on the basis of the user information stored in the reservation information table TB60 by controlling the communication I/F 120. For example, the communication control unit 111 may transmit the authentication information to a mail address of a using user. In addition, for example, the communication control unit 111 may transmit an access URL for authentication information. The reservation information table TB60 illustrated in FIG. 12 is an example, and the information stored in the storage device 500 may be more than or less than that.

The release information generating unit 116 may generate release information about release of control of facilities relating to a use target and the authentication terminal 700 among facilities inside the building 300 on the basis of the reservation information. When a period to a reservation date and time becomes within a predetermined threshold, the release information generating unit 116 may store the release information in the storage device 500 in association with authentication information. The predetermined threshold is an arbitrary period and may be 10 minutes or 5 minutes. The release information may be arbitrary information as long as it is information indicating a communication terminal of which control of facilities is permitted in a reservation time frame at the reservation year, month, and date. In addition, the "facilities relating to the authentication terminal" may be facilities that can be controlled in accordance with authentication using the authentication terminal being successful. For example, facilities relating to the authentication terminal may be the electronic lock, the flapper gate, the elevator, the air conditioning facility, the lighting facility and the like described above. In addition, in a facility relating to the authentication terminal, an authentication terminal may be disposed. In other words, an authentication terminal may be mounted in the flapper gate or the elevator.

The communication terminal 200A may include a communication control unit 211, a display control unit 212, and an input/output control unit 213 as functions embodied by the control unit 210. The storage unit 270A may store authentication information 272 received from the server 100.

The authentication terminal 700 may acquire authentication information transmitted from the server 100 to the communication terminal 200. In addition, the authentication terminal 700 may acquire release information associated with the authentication information from the reservation information table TB60 of the storage device 500. The authentication terminal 700 may transmit a release signal to a facility for which restriction is to be released on the basis of the acquired release information. In accordance with this, for example, restriction for an elevator, a gate, and an electronic lock of a conference room present on a path up to the conference room of which use has been reserved by the user A among elevators installed in the building 300 is released, and they can be used by the user A.

Control Flow of Information Processing System

Figure 13:
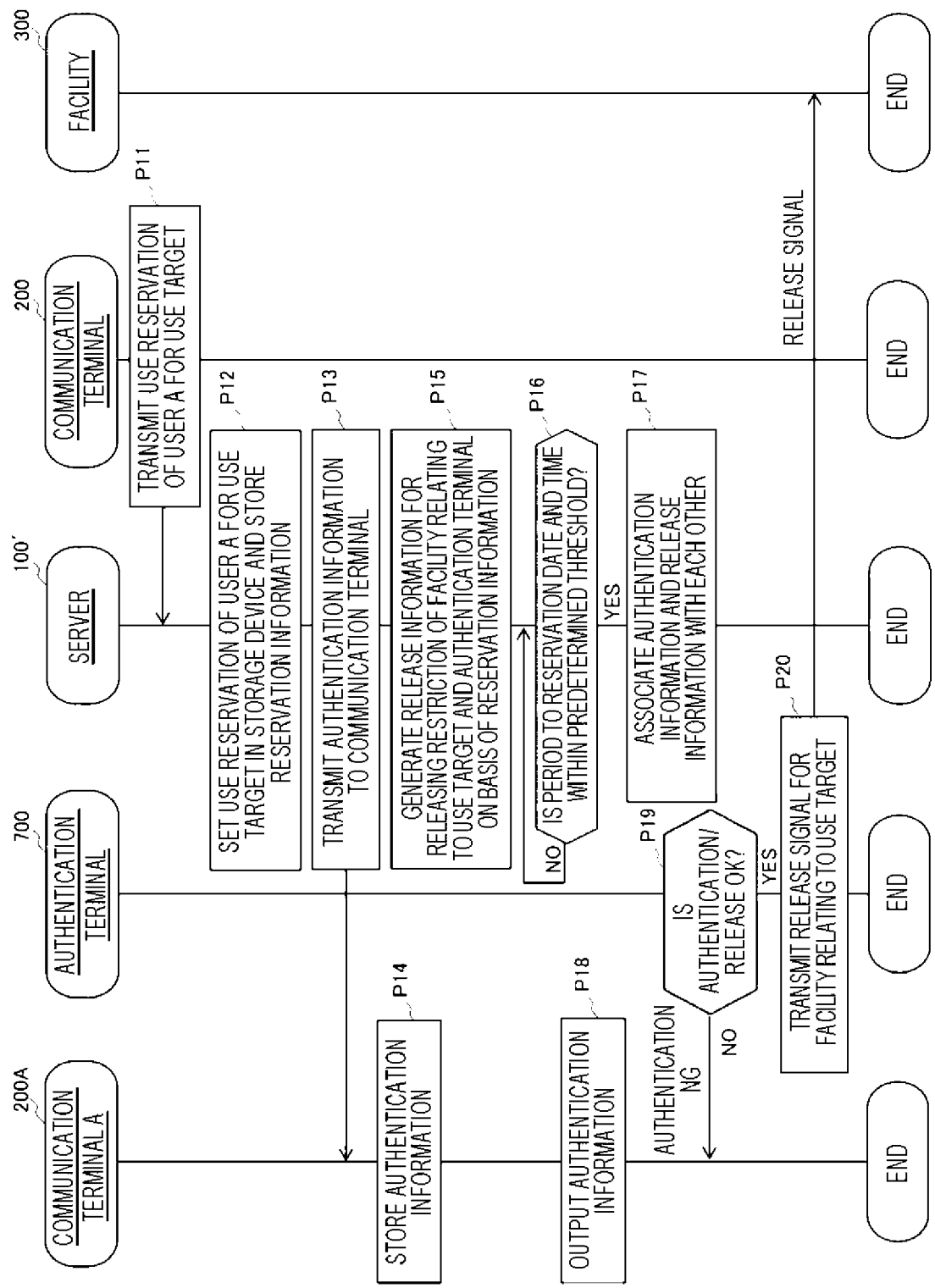
FIG. 13 is a sequence diagram of a server, a communication terminal, an authentication terminal, and a facility according to the second example.

Next, processing of the server 100' and the communication terminals 200 and 200A in the information processing system 800' according to one example described above will be described. FIG. 13 is a sequence diagram illustrating an example of the processing.

The communication control unit 211 of the communication terminal 200 may transmit a use reservation of the user A for a use target to the server 100' (Step P11). The reservation setting unit 113 of the server 100' may set a use reservation of the user A for a use target and stores reservation information in the storage device 500 (Step P12). In accordance with this, the reservation information table TB60 may be stored in the storage device 500. Next, the authentication information generating unit 117 of the server 100' may generate authentication information used for authenticating the communication terminal 200A on the basis of the reservation information and transmit the generated authentication information to the communication terminal 200A (Step P13). The communication terminal 200A may store the received authentication information in the storage unit 270 (Step P14). The release information generating unit 116 of the server 100' may generate release information used for releasing restriction of facilities relating to a use target and the authentication terminal 700 on the basis of the reservation information (Step P15). Thereafter, in the server 100', it may be determined whether or not a period to a reservation date and time is within a predetermined threshold (Step P16). When the period to the reservation time becomes within the predetermined threshold (Yes in Step P16), the communication control unit 111 may store the release information generated by the release information generating unit 116 in the storage device 500 in association with the authentication information (Step P17). When the period to the reservation time is not within the predetermined threshold (No in Step P16), in the server 100, it may be determined again whether or not the period to the reservation date and time is within the predetermined threshold (Step P16). In other words, until the period to the reservation date and time becomes within the predetermined threshold, association of the release information may be held.

The communication terminal 200A may output the authentication information to the authentication terminal 700 (Step P18). The output of the authentication information, for example, may be performed by displaying authentication information on a display screen of the communication terminal 200A and causing the authentication terminal 700 to read the authentication information. The authentication terminal 700 may authenticate authentication information acquired from the communication terminal 200A and determine whether or not the release information is associated therewith (Step P19). When the release information is associated therewith, the authentication terminal 700 may transmit a release signal for releasing restriction to facilities associated with the use target and the authentication terminal 700 (Step P20).

As described above, according to the second example, also for a user not using a reservation service, restriction for facilities of the building is released in accordance with a use reservation of a use target, and the user can perform control thereof. In addition, since control can be performed after the period to a start time of use becomes within a predetermined threshold, the security can be improved.

In recent years, work according to teleworking and a flexible time system socially spreads, and it is not essential for a worker to go to the office of a company to which he or she belongs unlike a conventional configuration. In accordance with this, a situation in which facilities inside an office such a conference room and a working room are not used frequently occurs, and renting/sharing of such a coreference room and the like that are not used to/with other companies is assumed to spread. In the situation described above, the information processing system 800 according to one example can be applied to sharing in which a use target which a certain company owns and has use authority thereof among use targets disposed inside the building 300 is caused to be used by unauthorized users of other companies. In accordance with this, sharing of a dedicated space of which use authority is owned by a company among companies can be flexibly embodied.

Although our systems and methods have been described on the basis of the drawings and the examples, a person skilled in the art can easily make various changes and modifications on the basis of this disclosure. Thus, such changes and modifications belong to the scope of this disclosure. For example, functions and the like included in each constituent unit, each step and the like can be rearranged without being logically contradictory, and a plurality of constituent units, steps and the like may be combined as one or may be divided or may be appropriately omitted or changed as necessary. In addition, the components illustrated in the examples described above may be appropriately combined. For example, each functional unit described to be included in the server 100 may be embodied with being distributed into a plurality of servers, and the communication terminal 200 may be included. To the contrary, each functional unit described to be included in the communication terminal 200 may be included in the server 100.

For example, in the description presented above, a conference room and a reception room inside a building have been described as examples of a use target. However, a use target may be a recreation room, a nap room, a shower room, a beauty salon, a nail salon, a massage/chiropractic corner, or a parking lot disposed in a building. In addition, the use target is not limited to a building but may be a guest room of a hotel.

In the description presented above, an example in which a beacon transmitter is installed in an elevator hall has been described. However, the signal transmitter may be installed inside an elevator, and an authentication process of the communication terminal 200 may be performed on the basis of a beacon signal received from the beacon transmitter. When the authentication is successful, release information may be transmitted from the server 100 to the elevator, and the restriction of input to a hard key (a floor number button) inside the elevator may be released. In addition, in accordance with authentication of the communication terminal 200 based on location information, direct input to a lighting device or an air conditioning device (an operation on an on/off switch of lighting, a brightness adjustment button, or an air conditioning device from a remote controller or the like) other than the elevator may be configured to be able to be performed.

In addition, when a plurality of communication terminals 200 associated with provisional authority are present, or communication terminals 200 of authorized users (a manager user and an ordinary user) are present, and a control request for facilities is transmitted from each of the communication terminals 200, control as below may be performed.

An Air Conditioning Facility

Control may be sequentially overwritten with control of a user who has performed control latest (for example, when a user B performs control of turning off air conditioning immediately after a user A performed control of turning on the air conditioning, the air conditioning may be turned off).

A priority level may be set to a communication terminal of each user, and control transmitted from the communication terminal 200 of which a priority level is high may be prioritized.

Control transmitted from a communication terminal from a user who has made a use reservation may be prioritized regardless of a type of authority.

An Elevator

Control details for each user may be sequentially added without the control being overwritten (for example, when a user B releases nonstop locking of a second floor immediately after a user A released nonstop locking of a third floor, release of nonstop locking of the second floor and the third floor may continue for a predetermined time).

A Security Device

While release of security is performed on the basis of use of a conference room, start of security according to another user may be excluded.

A program according to each example may be provided in a state being stored in a storage medium that is readable for an information processing device. The program may be configured to be able to be stored on a medium of "non-transitory type" as the storage medium. For example, the program may include a software program and an information processing device program.

The storage medium may include one or a plurality of semiconductor-based media or any other integrated circuit (IC) (for example, a field programmable gate array (FPGA), an application-specific IC (ASIC), or the like), a hard disk drive (HDD), a hybrid hard drive (HHD), an optical disc, an optical disc drive (ODD), a magneto-optical disk, a magneto-optical drive, a floppy diskette, a floppy disk drive (FDD), a magnetic tape, a solid state drive (SSD), a RAM drive, a secure digital card or drive, or an appropriate other arbitrary storage medium, or an appropriate combination of two or more such media as appropriate. The storage medium may be a volatile medium, a nonvolatile medium, or a combination of a volatile medium and a nonvolatile medium as appropriate.

In addition, a program according to this disclosure may be provided for the server 100 through an arbitrary transmission medium (a communication network, a broadcast waves or the like) that can transmit the program.

Furthermore, each example may be embodied also in the form of a data signal embedded in a carrier wave in which a program is implemented through electronic transmission.

In addition, a program may be implemented using an arbitrary program language, for example, a script language such as JavaScript (registered trademark) or Python, C language, Go language, Swift, Koltin, or Java (registered trademark).

INCORPORATION BY REFERENCE

This application is a continuation application of International Application No. PCT/JP2021/030084, filed on Aug. 17, 2021, which claims priority of Japanese (JP) Patent Application No. 2020-140150, filed on Aug. 21, 2020, the contents of which are hereby incorporated by reference in its entirety.

The invention claimed is:

1. An information processing system comprising:
   a gateway configured to connect facilities, of which control performed by an unauthorized user is restricted, to a network;
   an information processing device connected to the facilities via the network,
   the information processing device comprising an authority generating unit configured to generate authority information about provisional authority used to control facilities relating to a use target in a building based on a use reservation;
   a communication unit configured to transmit the authority information; and
   a communication terminal of a user configured to receive the authority information, the communication terminal comprising:
      a display control unit comprising a screen configured to display the facilities relating to the use target and receive user input comprising a selection of one or more facilities of the facilities relating to the use target, and
      a control request generating unit configured to generate a control request for requesting predetermined control of the one or more facilities in response to the selection, wherein the control request generating unit is configured to generate the control request for the one or more facilities before unlocking the use target, when a period until a date and time of the use reservation for the use target is within a predetermined threshold;
   wherein the use reservation comprises a reservation date and time of the use target and using user information about the user, and the communication unit is configured to transmit the authority information to the communication terminal of the user identified by the using user information; and
   wherein, when a period to the reservation date and time becomes within a predetermined threshold, the communication unit is configured to transmit the authority information to the communication terminal of the user.

2. The information processing system according to claim 1, wherein the communication unit is configured to receive the control request from the communication terminal and is configured to transmit the control request to a target facility requesting the predetermined control.

3. The information processing system according to claim 1, wherein the authority generating unit is configured to generate authority information about provisional authority for controlling facilities installed in a path to the use target in the building or facilities installed in the use target.

4. The information processing system according to claim 1,
   wherein the communication terminal further comprises an acceptance unit configured to accept input of control based on the provisional authority for facilities relating to the use target from the user, and
   the control request generating unit is configured to generate the control request based on the input.

5. The information processing system according to claim 1,
   wherein the communication terminal further comprises a location information acquiring unit configured to acquire location information about a current location of its own terminal in the building, and
   the control request generating unit is configured to generate the control request on a basis of the location information and the provisional authority.

6. The information processing system according to claim 5,
   wherein the communication unit is configured to receive the location information from the communication terminal and transmit a release signal for releasing a restriction for facilities associated with the location information, and
   wherein the facilities associated with the location information are configured to perform direct control input for input devices included in the facilities in accordance with the release signal.

7. The information processing system according to claim 6, wherein the location information acquiring unit of the communication terminal is configured to acquire the location information using a beacon signal transmitted from at least one beacon terminal disposed in the building.

8. The information processing system according to claim 5, wherein the location information acquiring unit of the communication terminal is configured to acquire the location information using a beacon signal transmitted from at least one beacon terminal disposed in the building.

9. An information processing system comprising:
- a gateway configured to connect facilities, of which control performed by an unauthorized user is restricted, to a network;
- an information processing device connected to the facilities via the network,
- the information processing device comprising an authority generating unit configured to generate authority information about provisional authority used to control facilities relating to a use target in a building based on a use reservation;
- a communication unit configured to transmit the authority information; and
- a communication terminal of a user configured to receive the authority information, the communication terminal comprising:
- a display control unit comprising a screen configured to display the facilities relating to the use target and receive user input comprising a selection of one or more facilities of the facilities relating to the use target, and
- a control request generating unit configured to generate a control request for requesting predetermined control of the one or more facilities in response to the selection, wherein the control request generating unit is configured to generate the control request for the one or more facilities before unlocking the use target, when a period until a date and time of the use reservation for the use target is within a predetermined threshold,
- wherein the communication terminal further comprises a location information acquiring unit configured to acquire location information about a current location of its own terminal in the building, and the control request generating unit is configured to generate the control request on a basis of the location information and the provisional authority;
- wherein the communication unit is configured to receive the location information from the communication terminal and transmit a release signal for releasing a restriction for facilities associated with the location information, and
- wherein the facilities associated with the location information are configured to perform direct control input for input devices included in the facilities in accordance with the release signal.

10. The information processing system according to claim 9, wherein the location information acquiring unit of the communication terminal is configured to acquire the location information using a beacon signal transmitted from at least one beacon terminal disposed in the building.

* * * * *